(12) United States Patent
Ota et al.

(10) Patent No.: US 7,341,802 B1
(45) Date of Patent: Mar. 11, 2008

(54) FEEDTHROUGH ASSEMBLY AND METHOD

(75) Inventors: Naoki Ota, Valencia, CA (US); Hiroshi Nakahara, Santa Clarita, CA (US); David L. DeMuth, Santa Clarita, CA (US); M. Elizabeth Bush, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 636 days.

(21) Appl. No.: 10/811,434

(22) Filed: Mar. 25, 2004

(51) Int. Cl.
*H01M 2/06* (2006.01)

(52) U.S. Cl. ............... 429/181; 429/181; 174/50.61

(58) Field of Classification Search ............ 429/181, 429/184; 174/50.61
See application file for complete search history.

(56) References Cited

U.S. PATENT DOCUMENTS

| | | | |
|---|---|---|---|
| 2,912,340 A | 11/1959 | Pincus | |
| 3,006,069 A | 10/1961 | Rhoads et al. | |
| 3,416,964 A | 12/1968 | Michalko | |
| 3,421,945 A | 1/1969 | Michalko | |
| 3,646,405 A * | 2/1972 | Wallis et al. | 174/50.61 |
| 3,901,772 A | 8/1975 | Guillotin et al. | |
| 3,957,538 A | 5/1976 | Fairweather et al. | |
| 4,127,702 A | 11/1978 | Catanzarite | |
| 4,233,372 A * | 11/1980 | Bro et al. | 429/181 X |
| 4,292,380 A | 9/1981 | O'Boyle et al. | |
| 4,331,745 A | 5/1982 | Catanzarite | |
| 4,337,302 A | 6/1982 | Takizawa | |
| 4,352,714 A | 10/1982 | Patterson et al. | |
| 4,904,551 A | 2/1990 | Denoncourt et al. | |
| 5,042,847 A | 8/1991 | Lasecki et al. | |
| 5,241,216 A | 8/1993 | Webster | |
| 5,273,203 A | 12/1993 | Webster | |
| 6,111,198 A * | 8/2000 | Tower | 174/50.61 X |
| 6,335,117 B1 | 1/2002 | Yoshida et al. | |
| 6,410,161 B1 | 6/2002 | Li | |
| 6,509,115 B2 * | 1/2003 | Kim et al. | 429/181 X |
| 6,673,489 B2 * | 1/2004 | Fong et al. | 429/181 |
| 6,677,076 B2 * | 1/2004 | Nakahara et al. | 429/94 |
| 6,696,199 B2 * | 2/2004 | Yoshida et al. | 429/181 X |
| 7,029,790 B2 * | 4/2006 | Mizuno et al. | 429/181 X |
| 7,145,076 B2 * | 12/2006 | Knappen et al. | 174/50.61 X |

FOREIGN PATENT DOCUMENTS

JP 56-086454 7/1981

* cited by examiner

*Primary Examiner*—Stephen J. Kalafut
(74) *Attorney, Agent, or Firm*—Gavrilovich Dodd & Lindsey, LLP

(57) ABSTRACT

A feedthrough is insulated and hermetically sealed by brazing a ceramic disk to a case cover and by brazing the top surface of the ceramic disk to the bottom surface of a feedthrough pinhead. Using this technique instead of forming a compression seal, the surface area for bonding is increased, increasing bond strength. The ceramic disk electrically insulates the feedthrough pin from the cover, and provides a large surface area for mechanically sealing the cell with the braze. Considering the small size of many cells, this increased surface area is important for getting a good seal and increasing bond strength. This design also creates a longer fluid path, providing greater hermeticity. Furthermore, a greater range of component material combinations is available because CTE compatibility limitations of the feedthrough pin, cover, and insulator are minimized. This feedthrough is applicable to broad array of applications and numerous material combinations.

22 Claims, 5 Drawing Sheets

FEEDTHROUGH ASSEMBLY AND METHOD

TECHNICAL FIELD

The present invention relates to battery components, and more particularly, a battery feedthrough assembly and method for making it.

BACKGROUND

In many applications, particularly in medical and aerospace fields, minimizing volume and weight is a major goal in battery design. As battery technology continues to make great strides, battery sizes have greatly decreased. Because of size and weight constraints, the number of available materials used for various battery components is decreasing. Furthermore, when providing batteries for a replacement market, the size of the battery is constrained by the available space in the existing device. For example, for replacement batteries for certain models of a hearing aid already in use, the battery thickness is limited to 3.6 mm, and the diameter is 5.8 mm. In order to not reduce the capacity of the cell, the space taken up by nonreactive components, such as the battery case and sealing components, must be minimized, thus reducing the amount of room available to seal the battery case.

Lithium-ion batteries provide high energy densities; however, a major problem associated with these cells is the highly corrosive nature of lithium battery chemistry. Hermetic seals are used to protect living tissue from corrosive battery components and to protect battery components from corrosive bodily fluids. Hermetic seals must be manufactured as ruggedly as possible for applications where hermeticity will be required for extended exposures to harsh environments.

Electronic device seals that bond glass to metal are generally known in the art. Molecular bonding is accomplished by oxidizing the surface of the metal component to facilitate bonding to the glass component. Heating the components causes the glass to soften and flow into the oxidized area of the metal component thereby creating a hermetic seal when the components are cooled. For typical feedthrough constructions using a glass as the insulator, a compression seal is created, for example, where an outer body (typically a metal case) has a coefficient of thermal expansion (CTE) that is greater than that of an insulating component (typically glass), and the insulating component has a CTE that is greater than that of a metal component (typically a pin). Once heated to 950° C. or greater, the differing CTE facilitates the glass flowing into the case to form a seal, and likewise, the glass to compress the pin to form yet another seal. It is desirable for the glass and metal to have similar CTE to avoid stress breaks during the heating and cooling processes. Thermal expansion is particularly problematic where the CTE of the battery case material differs substantially from that of the pin or insulator material.

Therefore, to form an acceptable glass-to-metal seal in a lithium or lithium-ion battery, the glass must have a high resistance to lithium corrosion; it must be able to make a hermetic seal between the metal header and the metal pin, which requires a thermal expansion match between the glass and the pin; and it must be an electrical insulator so that the case cover and the pin are electrically isolated. Also, where feedthroughs may come into contact with bodily fluids, it is necessary to choose biostable materials.

To manufacture a battery, typically, an electrode assembly is placed in a case having a cover. To keep weight at a minimum, it is desirable to use strong, yet lightweight materials for the battery case and cover. These materials may, as an example, include titanium and titanium alloys. However, titanium presents problems in most applications in that its CTE varies greatly from materials traditionally used for the feedthrough pin, resulting in seal failures.

The battery case is hermetically sealed to prevent corrosion and to avoid leakage of the internal electrolyte, which is typically very corrosive. Because of corrosion issues, only a limited number of materials can be used in contact with the electrolyte. For the positive feedthrough of a lithium ion battery, these materials include aluminum, platinum, gold, niobium, tantalum, molybdenum, and stainless steel. Because the CTE of the desirable battery cover material, e.g. titanium, is generally markedly different from the CTE of desirable pin material, e.g., stainless steels that can withstand electrolyte exposure, these materials tend to expand and contract at differing rates. The CTE of the insulating member may be different from that of one or both components as well. These differences in CTE make it difficult to form a good seal between the insulating body and the case or terminal pin during manufacturing, or may cause the seal to break during use.

To prevent these problems, the prior art has generally called for the requirement of materials that have compatible CTEs. As mentioned previously, a compression seal can be formed when the CTE for the pin material is less than that of the battery cover material. A quick look at stainless steel CTE reveals that these CTEs are larger than that for titanium and Ti-6Al-4V alloy, essentially eliminating this combination of materials for forming a glass compression seal.

TABLE 1 shows the CTE of various materials.

| | CTE [$10^{-6}$/° C.] |
|---|---|
| Conductors | |
| Aluminum | 23.5 |
| 1000 series (1004) | |
| Gold | 14 |
| Au 100 | |
| Nickel | |
| 42 Alloy | 4.7 |
| Kovar (Co17, Ni29) | 6 |
| Platinum | |
| Pt 100 | 9 |
| PtIr | 9.2 |
| Stainless Steel | |
| 304 | 17.2 |
| 304L | 17.2 |
| 305 | 17.2 |
| 316 | 15.9 |
| 316L | 15.9 |
| 410 | 9.9 |
| 420 | 10.3 |
| 446 | 10.4 |
| Titanium | |
| Titanium CP | 8.4 |
| Ti 6AL-4V | 8.8 |
| Insulators | |
| Nonglass Ceramics | 7.6 |
| $Al_2O_3$ | |
| Glass | 6.7 |
| CaBAl 12 | |

Furthermore, the compression seal described above requires a minimum thickness for the various components. For applications in which the overall thickness of the battery is limited, such as in the hearing aid replacement battery market, there is simply not enough room allotted to the feedthrough to provide the thickness of material necessary to form a strong glass compression seal.

SUMMARY

The present invention provides a feedthrough that is insulated and hermetically sealed by brazing a ceramic disk to a case cover and by brazing the top surface of the ceramic disk to the bottom surface of a feedthrough pinhead. By brazing these components in this manner instead of forming a traditional compression seal, the surface area for bonding is increased, increasing bond strength. The ceramic disk electrically insulates the feedthrough pin from the cover, and provides a large surface area for mechanically sealing the cell with the braze. Considering the small size of many cells, this increased surface area is important for getting a good seal and increasing bond strength. This low profile design also maximizes internal volume available for the electrode assembly and electrolyte. This design also creates a longer fluid path, providing greater hermeticity. Furthermore, a greater range of component material combinations is available because CTE compatibility limitations of the feedthrough pin, cover, and insulator are minimized. This feedthrough is applicable to a broad array of applications and numerous material combinations.

Nonglass ceramics may be sealed to metal using a braze, for example, as described in U.S. Pat. No. 6,607,843 and pending U.S. application Ser. No. 10/430,036, both of which are assigned to the assignee of the present invention and hereby incorporated herein by reference. Brazed ceramic bonds can have greater mechanical strength than glass seals. Brazing allows material combinations that are not available using glass to metal sealing technology.

The battery case can be made of strong, lightweight material such as titanium. The invention herein may be used to make a positive or negative feedthrough terminal. Several embodiments of the present invention are disclosed that provide a new and improved feedthrough assembly and method that may be easily and efficiently manufactured at low cost with regard to both materials and labor. These feedthrough assemblies are of durable and reliable construction and are useful in a myriad of applications and situations. These feedthrough assemblies are not complicated, and are very small, so they can be made without reducing capacity. This feedthrough can be used for miniature batteries that require a hermetic seal and improved seal strength, such as implantable cells. Miniature batteries having a diameter greater than the height include coin cells and button cells, so-called due to their shapes. A typical miniature cell that could benefit from this seal is 5.8 mm diameter×3.6 mm thick. These cells typically have a crimped plastic seal that is generally inadequate for implantable applications. Cells having this type of seal typically have a leak rate of about $10^{-10}$-$10^{-6}$ atm-cc/sec He, while implantable cells have a maximum leak rate of about $10^{-7}$-$10^{-9}$ atm-cc/sec He, depending on the life expectancy of the device being powered, with $10^{-8}$-$10^{-9}$ atm-cc/sec He being typical for a 10 year life. Because of the space constraints, and in particular, the limited height dimension, a compression seal may not be possible. The feedthrough of the present invention can be designed to be low profile, as is usually desired for such cells. Although this feedthrough provides significant improvements over the prior art, the shape of the cell can be maintained so as to preserve the form, fit, and function with existing battery-powered devices.

This feedthrough can be made with a double seal, for example, using an outer brazing material to provide good adhesion and an inner brazing material to provide good chemical stability in contact with the electrolyte. Alternatively or additionally, a polymer may be used as an inner sealing material to provide an electrically insulating seal.

BRIEF DESCRIPTION OF THE DRAWINGS

The accompanying drawings, which are incorporated in and constitute a part of the specification, illustrate presently preferred embodiments of the present invention, and together with the preceding general description and the following Detailed Description, explain the principles of the present invention.

DETAILED DESCRIPTION

Embodiments consistent with the present invention address the need for an efficient and reliable feedthrough assembly and method. The device and method described herein may be implemented in a variety of manners. Accordingly, the description of a particular embodiment herein is intended only for the purposes of example, and not as a limitation. Features described with respect to an embodiment described herein are not limited to that embodiment and may be applied to other embodiments described herein. For example, several case configurations are shown herein, and each case configuration may be combined with any feedthrough configuration herein. Furthermore, the case configuration is not limited to those described herein.

Figure 1:
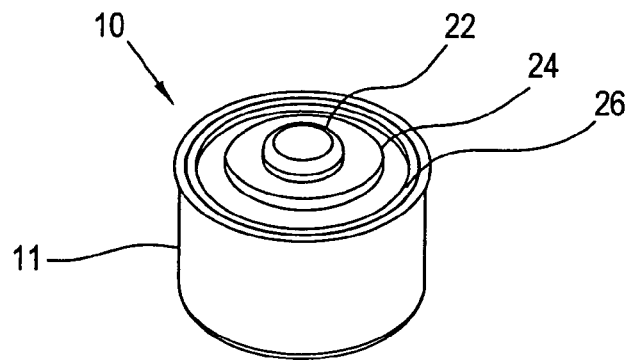
FIG. 1 is a diagram of a preferred embodiment of a cell of the present invention.

FIG. 1 is an isometric view of a preferred embodiment of the cell 10 of the present invention illustrating its principal components. The battery case 11 in the present invention can be made of strong, durable, and lightweight material such as titanium. Preferred battery case materials for applications wherein weight is less critical include 304, 304L, 316, and 316L stainless steels. A preferred battery case material for applications not requiring hermeticity is nickel plated iron. A case cover may be part of case 11 as case cover 66 in FIGS. 8 and 9, or may be a separate component as case cover 26 in FIGS. 1-5. Case cover 26 may comprise the same material as case 11 or may be a different material. A feedthrough pin 22 is insulated from case cover 26 by an insulator 24, made of a nonglass ceramic such as alumina, and extends through the battery case cover 26 for connection to an electrode within the battery case.

The present invention allows for the use of multiple and varying materials for pin 22. For example, pin 22 may effectively be constructed of steels, such as stainless steels, and nickel alloys, such as KOVAR®& alloy, and 42 alloy. Pin diameters can be about 0.1 to about 3 mm.

Figure 2:
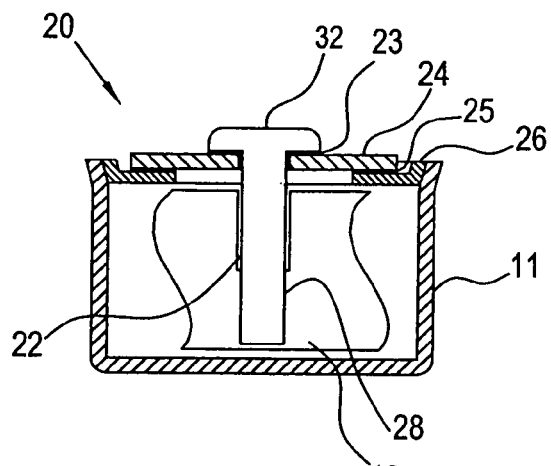
FIG. 2 is a cross sectional view of the cell shown in FIG. 1.

The type of electrode assembly housed within case 11 is not limited and may comprise a pellet, a stack, a jellyroll, or any other type known in the art. As shown in FIG. 2, electrode 18 is mechanically and electrically connected to the feedthrough pin 22, preferably directly, or via a current collector comprising a material selected to be compatible with the electrolyte. Such compatible materials include aluminum, platinum, gold, niobium, tantalum, molybdenum, and stainless steel. The material of electrode 18 and that of the current collector are chosen to be compatible with the electrolyte. In one material combination, when using a titanium case, the pin 22 can be KOVAR® alloy and the current collector can be a corrosion resistant stainless steel. The connection of electrode 18 to the current collector, or tab, or to pin 22 may be made by any means known in the art and may comprise resistance welding, laser welding, and other forms of welding, or mechanical fasteners, such as crimps, clamps, rivets, screws, pressure fits, and adhesives, including conductive adhesives. Alternatively, the mechanical and electrical connections can be separated, using the principles taught in U.S. Pat. Nos. 6,063,523 and 6,458,171, each of which is assigned to the assignee of the present invention and incorporated herein by reference in its entirety. These two patents teach a method for connecting a tab to an electrode, but the principle of separating the electrical and mechanical connections can also be applied to connecting a current collector to a feedthrough pin. Another alternative that can be used to connect the feedthrough pin to the electrode is the Feedthrough Assembly and Method taught in U.S. patent application Ser. No. 10/307,560, filed Nov. 27, 2002, and assigned to the assignee of the present invention and incorporated herein by reference in its entirety. Connection may be accomplished by a number of means including the use of a resistance weld, and may be facilitated using a feature formed on the pin such as pin slot 28. Other connection methods include other forms of welding, such as laser welding, and mechanical fasteners, such as crimps, clamps, rivets, screws, pressure fits, adhesives including conductive adhesives, and combinations thereof. Pin 22 may be used as a winding arbor as described in U.S. patent application Ser. No. 10/167,688, filed Jun. 12, 2002, and assigned to the assignee of the present invention and incorporated herein by reference in its entirety. To facilitate assembly, pin slot 28 may be used to engage an electrode (or tab for connection to an electrode), via crimping, welding, friction, or the like. When used as a winding arbor, the shaft of pin 22 preferably extends almost to the bottom of the battery case. When pin 18 is used as a winding arbor, insulator 24 is preferably brazed to cover 26 prior to winding the electrode assembly so that the brazing process does not disturb the wound electrode assembly. Furthermore, the fixture used to hold to brazed feedthrough during winding may be constructed to apply forces only to the pin and not to the brazed joints, or to constrain the components such that the brazed joints of insulator 24 to pin and cover 26 are mainly in compression and not in shear.

As used herein, the term electrolyte refers to any solution or molten compound that conducts electricity. The electrolyte may be of various compositions, such as those formed from strong acids (HF, HCl, HBr, HI, $HNO_3$, $H_2SO_4$ and $HClO_4$), strong bases (all the Group IA and IIA hydroxides) and all soluble salts. Furthermore, the electrolyte may be formed by placing a liquid, such as a strong base, into a battery case containing battery components and allowing the liquid to physically or chemically react with the case and/or components to create the electrolyte for the battery. For a lithium ion battery, the electrolyte may comprise a nonaqueous, ionically conductive electrolyte comprising a salt, which can be an ionizable alkali metal salt, dissolved in a mixture of organic solvents chosen for their physical properties, such as viscosity, permittivity, and ability to dissolve the solute. Lithium salts known to be useful in lithium ion batteries include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, lithium bis(chelato)borates such as lithium bis (oxalato)borate (LiBOB), and mixtures thereof. Solvents include esters, linear and cyclic ethers, dialkyl carbonates such as tetrahydrofuran (THF), methyl acetate (MA), diglyme, triglyme, tetraglyme, dimethyl carbonate (DMC), 1,2-dimethoxyethane (DME),1,2-diethoxyethane (DEE),1-ethoxy,2-methoxyethane (EME), ethyl methyl carbonate (EMC), methyl propyl carbonate, ethyl propyl carbonate, diethyl carbonate (DEC), dipropyl carbonate, cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. One such electrolyte for a cell of the present invention comprises $LiPF_6$ in a mixture of cyclic and linear carbonates, such as 30:70 EC:DEC.

Figure 3:
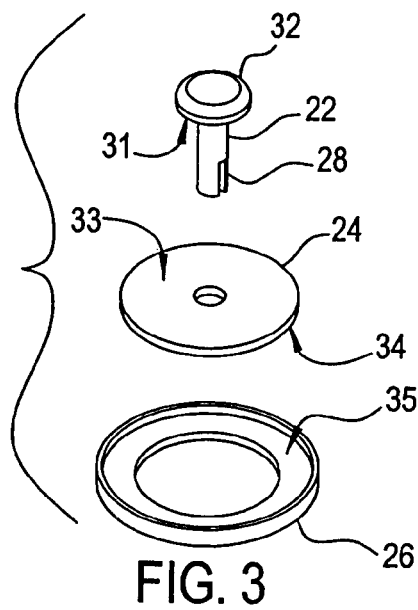
FIG. 3 is an exploded view of the feedthrough of FIG. 2.

FIG. 2 is a cross sectional view of the cell of FIG. 1, and FIG. 3 is an exploded view of the feedthrough of FIG. 1. Pin 22 is mechanically coupled to insulator 24 using braze 23 to bond the underside 31 of pinhead 32 to the top surface 33 of insulator 24. Braze 23 may optionally extend onto the surface of insulator 24 forming the hole through which pin 22 extends to provide a larger bonding area. Insulator 24 is mechanically coupled to cover 26 using braze 25 to bond the bottom surface 34 of insulator 24 to the top surface 35 of cover 26. Exemplary dimensions for the various components are as follows: pin head thickness of 0.1 to 1.5 mm, insulator thickness of 0.05 to 0.5 mm, cover thickness of 0.05 to 0.6 mm, pin diameter of 0.1 to 3 mm, braze thickness of 0.1 mm max, and an overall sealed cover thickness of 1 mm or less. Preferably, the thicknesses of the pinhead 32, insulator 24, and cover 26 are each about 0.25 mm or less, and more preferably about 0.2 mm or less. This produces an overall sealed cover thickness of preferably about 0.8 mm or less, and more preferably about 0.7 mm or less.

Figure 4:
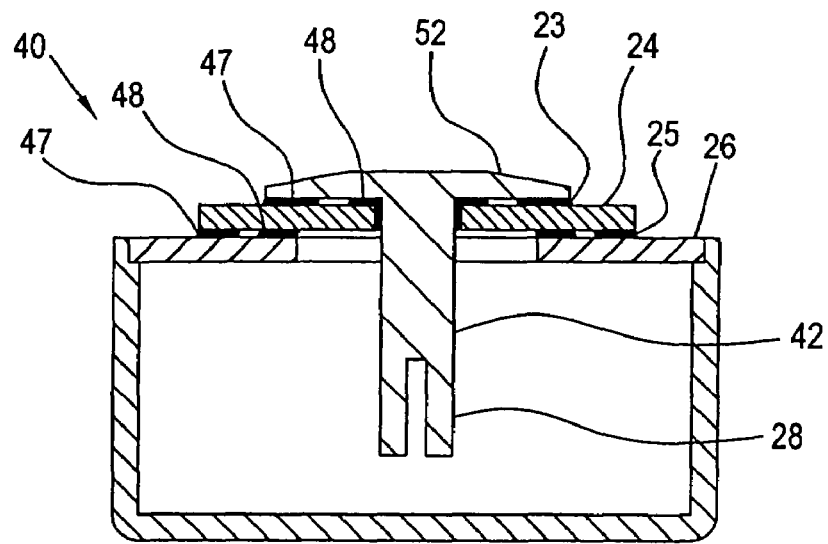
FIG. 4 is a cross sectional view of a cell showing an alternative preferred embodiment of the feedthrough.

Braze 23 and braze 25 may have the same or different material composition, and preferably are selected to be compatible with the chosen electrolyte and components being joined so that only one brazing material is needed for each braze 23 and 25. Using only one brazing material for each braze simplifies assembly, especially in very small batteries that have very little surface area for brazing. Alternatively, as shown in FIG. 4, two different brazing materials 47 and 48 may be used for each braze 23 and 25, with an outer brazing material 47 providing strong adhesion and an inner brazing material 48 providing chemical stability with the electrolyte. For example, Mn—Mo, Mo—W, or W can be used for bond strength, and precious metals such as Au, Pt, Au—Pt, and Ag can be used for preventing corrosion from the electrolyte. See, for example, JP56-086454. As an alternative to or in addition to inner brazing material 48, epoxy or another polymer may be used as an inner sealing material to provide protection against corrosion of the outer brazing material 47; if the epoxy or other polymer is nonconductive, it may also provide an electrically insulating seal.

For a positive polarity feedthrough, the braze can be 90Au/10Cu or 90Au/10Pt. Other brazes include Au—Ti and Au—Ag. In general, gold alloy brazes are preferred, particularly those having higher gold percentages. The brazing temperature will depend on the materials used, and is typically above about 430° C. It is preferable that the melting point of the brazing material be less than the solidus of the pin and cover materials. For example, if a titanium cover is used, having a solidus of 1725° C., the brazing should be performed below 1725° C. However, if using a cover made of aluminum, having a solidus of about 650° C., or a low melting point aluminum alloy, which may have a solidus in the 500° C. range, the brazing material must be carefully considered because the temperature must be kept much lower. A preferred aluminum alloy for use with typical lithium and lithium ion chemistries and their associated electrolytes is Aluminum 3003, which is preferably brazed with brazing materials having a melting point of 571 to 621° C. By comparison, 300 and 400 series stainless steels utilize brazes having a melting point between 927 and 1204° C., and iron/nickel alloys utilize brazes having a melting point of 871 to 1232° C.

Figure 5:
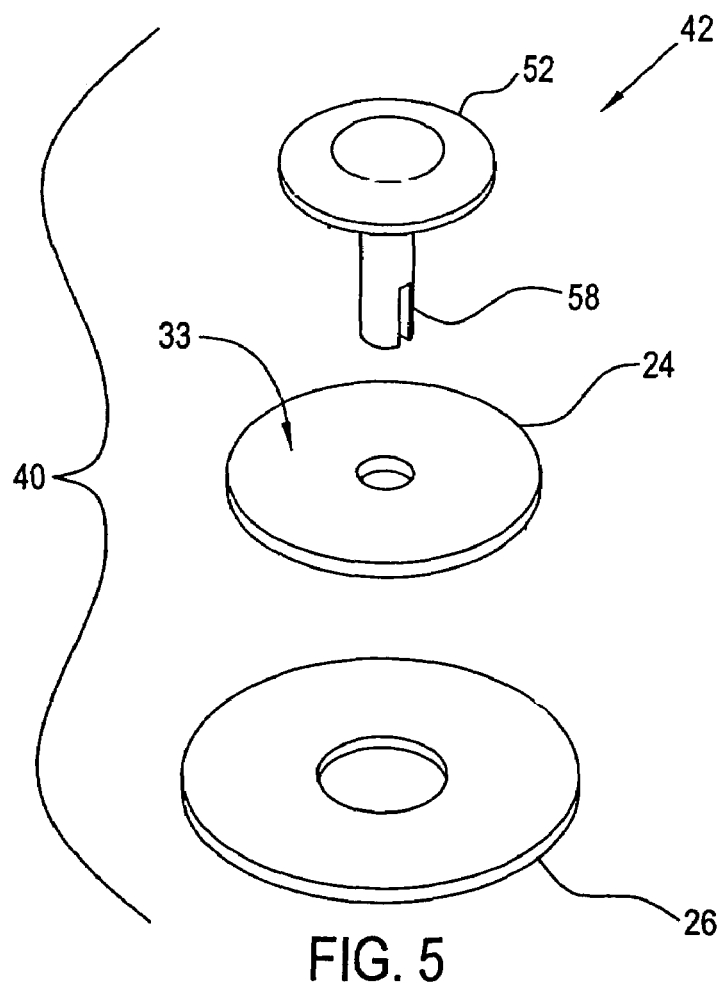
FIG. 5 is an exploded view of the feedthrough of FIG. 4.

FIG. 4 is a cross sectional view of a cell and FIG. 5 is an exploded view of an alternative embodiment of the feedthrough 40 illustrating a design wherein pin 42 has a pinhead 52 having a diameter larger than the diameter of the hole in cover 26. This structure provides greater support both during manufacture and during use, wherein applying pressure to the feedthrough pinhead 52 transfers force through the insulator 24 to the cover 26. Because ceramics are much better in compression than in tension, this structure provides an advantage by removing much of the tensile component of stress resulting from pressing on the feedthrough pin.

Figure 6:
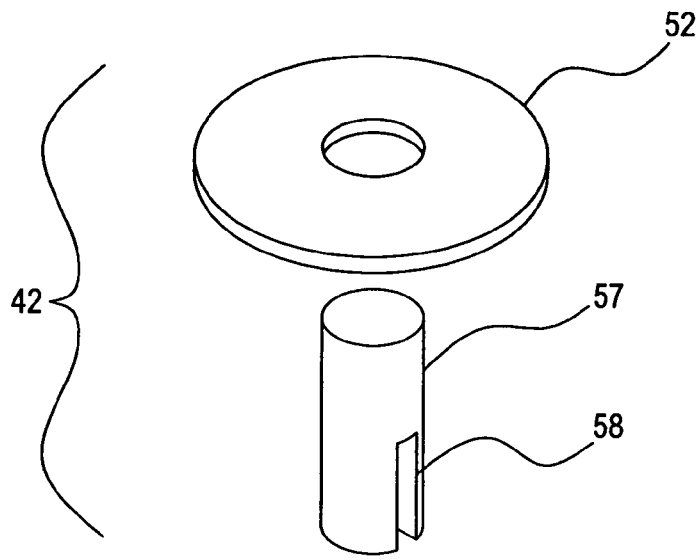
FIGS. 6 and 7 are exploded views of alternative embodiments of the pin of FIG. 4.
Figure 7:
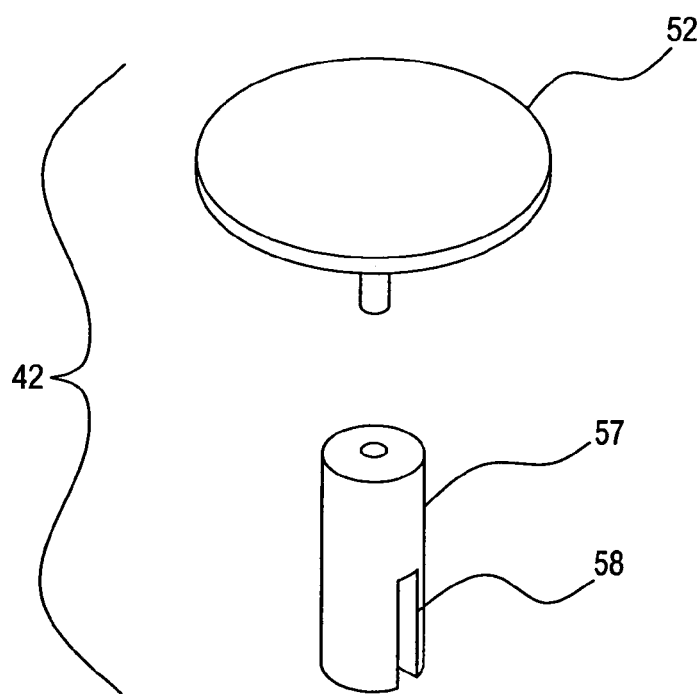

FIGS. 6 and 7 are exploded views showing that the feedthrough pin of the present invention may comprise two pieces joined by bonding, swaging, crimping, welding, screwing, brazing, or the like. As shown, pin 42 comprises a first piece forming the head 52 and a second piece forming the shaft 57 and having an optional connection feature, pin slot 58. In an alternative embodiment (not shown) the pin may comprise a threaded washer forming head 52 screwed onto a threaded shaft 57.

Figure 8:
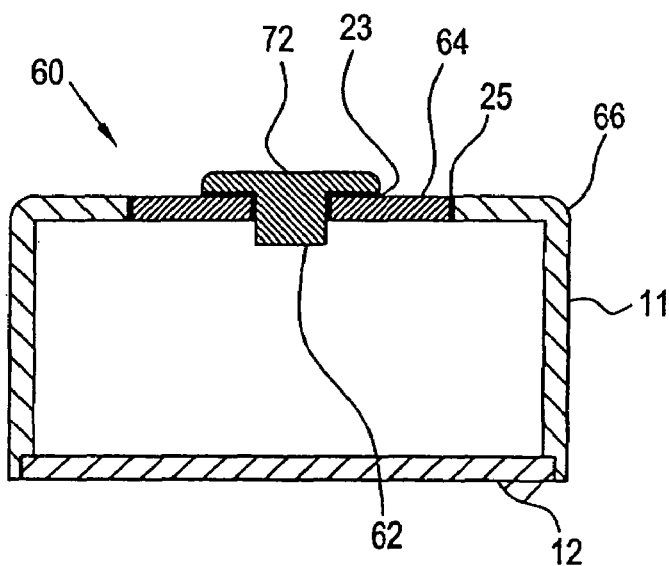
FIG. 8 is a cross sectional view of a cell having an alternative embodiment of the feedthrough.
Figure 9:
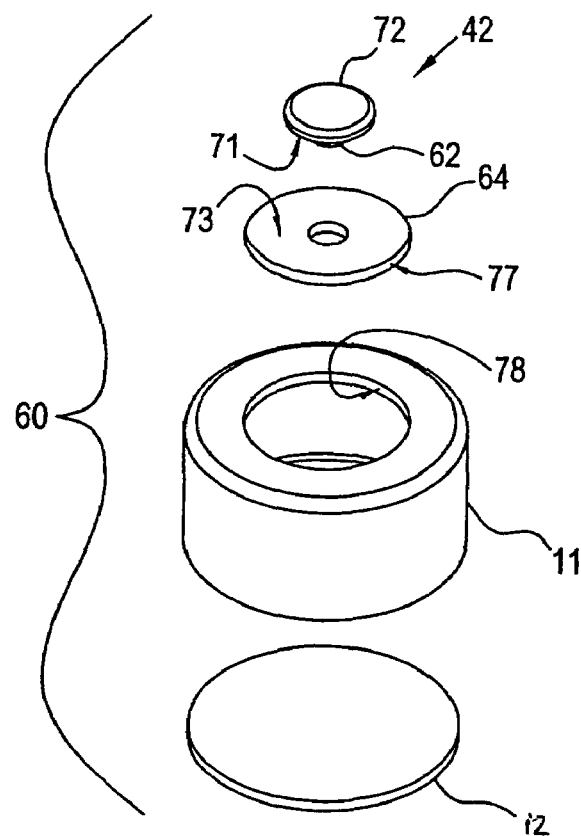
FIG. 9 is an exploded view of the cell of FIG. 8.

FIG. 8 is a cross sectional view and FIG. 9 is an exploded view of a cell having another embodiment of the feedthrough 60. Here, the insulator 64 has an outer diameter that is about the same as the inner diameter of the opening of cover 66, allowing room for braze 25, and the outer surface 77 of the insulator 64 is brazed to the inner surface 78 of the opening of the cover 66 using braze 25, as illustrated. In this feedthrough embodiment, cover 66 is shown as integral with case 11 and sealed with bottom plate 12; however, this feedthrough embodiment may be used with any case design known in the art, including others shown herein. The underside 71 of the pinhead 72 is brazed to the top surface 73 of insulator 64 using braze 23. The pin 62 extends through the insulator 64. Braze 23 may also extend onto the shaft portion of pin 62 as shown to provide more bonding surface with insulator 64. With this feedthrough configuration, the thickness can be kept very small. For example, if the pinhead 72 is 0.2 mm thick and the cover 66 and insulator 64 are each 0.25 mm thick, the overall thickness is only about 0.45 mm thick.

Figure 10:
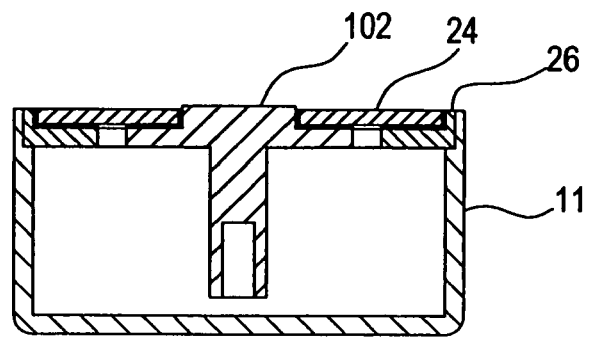
FIGS. 10-12 are cross sectional views of alternative preferred embodiments of the present invention.
Figure 11:
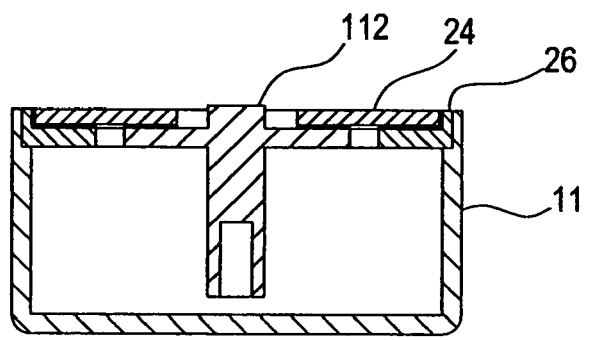
Figure 12:
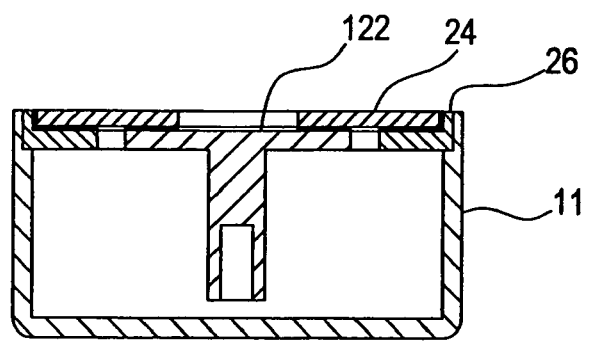

FIGS. 10-12 are cross sectional views of alternative preferred embodiments of the present invention. In these embodiments, the overall thickness of the sealed cover can be minimized while maximizing brazing area and utilizing a preferred case to cover weld configuration. In these embodiments, both the pin (102, 112, or 122) and the cover 26 are brazed to the underside of the insulator 24. Although the cover can be welded to the case from the side, top-down welding of a cover 26 to case 11 is preferred for ease of manufacturing; it also protects the feedthrough and electrode assembly from overheating during the welding process. With this feedthrough configuration, the thickness can be minimized. For example, if the pinhead, cover, and insulator are each 0.2 mm thick, the overall thickness is only about 0.4 mm thick.

The pin design will depend on a number of factors, including the type of external contact it is to be used with and the type of electrode assembly with which it will connect. When the pin is used as a winding arbor, a pin slot may be formed to engage an electrode for winding, and the pinhead may be designed with one or more features, such as a blind keyhole (not shown) for fixturing to an electrode winding machine.

The preferred pin 102 of FIG. 10 has a pinhead that extends above the bottom of insulator 24, and preferably slightly above the top of insulator 24, as shown, to facilitate connection with a contact such as a spring contact. The shape of the pinhead provides maximum surface for brazing, including the underside of insulator 24 and the surface of the hole through insulator 24.

The pin 112 of FIG. 11 also has a pinhead that extends slightly above the top of insulator 24 to facilitate contact. However, the shape of the top portion of the pinhead extending through the insulator hole is narrower than the diameter of the hole in insulator 24, so only the lower portion of the pinhead is brazed to the insulator 24.

The pin 122 of FIG. 12 has a pinhead that does not extend above the bottom of the insulator 24; although a small spring contact could be used with such a design, other types of contact known in the art would likely be more suitable for use with pin 122.

In the embodiments of FIGS. 10-12, the outer edge of the pinhead may be spaced sufficiently far from the inner edge of cover 26 such that electrical insulation is not needed between them. Alternatively, the space between them may be filled with an insulative epoxy, polymer, or a ridge formed on insulator 24 (not shown) to electrically insulate the pin from the cover.

The specific implementations disclosed above are by way of example and for enabling persons skilled in the art to implement the invention only. We have made every effort to describe all the embodiments we have foreseen. There may be embodiments that are unforeseeable and which are insubstantially different. We have further made every effort to describe the invention, including the best mode of practicing it. Any omission of any variation of the invention disclosed is not intended to dedicate such variation to the public, and all unforeseen, insubstantial variations are intended to be covered by the claims appended hereto. Accordingly, the invention is not to be limited except by the appended claims and legal equivalents.

What is claimed is:

1. A feedthrough assembly for an electrochemical cell, comprising:
   a cover having a top surface and a bottom surface and a hole through the cover;
   an insulator having a top surface and a bottom surface and a hole through the insulator; and
   a pin having a pin shaft and a pinhead with a larger diameter than the pin shaft; wherein
   a first portion of the insulator bottom surface is brazed to the top surface the case cover;

a second portion of the insulator bottom surface is brazed to a top surface of the pinhead.

2. The feedthrough assembly of claim 1, wherein a portion of the pin extends into the hole through the insulator.

3. The feedthrough assembly of claim 1, wherein a portion of the pin extends above the hole through the insulator.

4. A sealed battery, comprising:
   a battery case;
   a positive electrode within the case;
   a negative electrode within the case;
   an electrolyte within the case; and
   a feedthrough of claim 1 sealing the case, wherein the pin is electrically coupled to one of the electrodes.

5. The battery of claim 4, wherein the positive and negative electrodes are wound around the pin.

6. A feedthrough assembly for an electrochemical cell, comprising:
   a cover having a hole surface that defines a hole through the cover;
   an insulator having a top surface and a bottom surface and a hole through the insulator, and an outer surface in the hole through the cover; and
   a pin comprising a pinhead and a pin shaft, the pin shaft extending through the insulator hole and through the cover hole, the pinhead having a larger diameter than the pin shaft; wherein
   the insulator outer surface is brazed to the hole surface and
   the insulator has a thickness that is about the same as a thickness of the cover in the region of the hole through the cover.

7. The feedthrough assembly of claim 6, wherein the top surface of the insulator is brazed to an underside of the pinhead.

8. The feedthrough assembly of claim 7, wherein the insulator is brazed to a portion of the pin shaft.

9. The feedthrough assembly of claim 6, wherein the pinhead and the pin shaft are formed of one piece of metal.

10. The feedthrough assembly of claim 6, wherein the pinhead and the pin shaft are formed of more than one piece of metal.

11. The feedthrough assembly of claim 6, wherein the pin shaft has a diameter of about 0.1 mm to about 3 mm.

12. The feedthrough assembly of claim 6, wherein the insulator includes a nonglass ceramic.

13. A sealed battery comprising:
    a battery case;
    a positive electrode within the case;
    a negative electrode within the case;
    an electrolyte within the case; and
    a feedthrough of claim 6 sealing the case, wherein the pin is electrically coupled to one of the electrodes.

14. The battery of claim 13, wherein the positive and negative electrodes are wound around the pin.

15. A feedthrough assembly for an electrochemical cell, comprising:
    a cover having a hole surface that defines a hole through the cover;
    an insulator having a top surface and a bottom surface and a hole through the insulator, and an outer surface in the hole through the cover; and
    a pin comprising a pinhead and a pin shaft, the pin shaft extending through the insulator hole and through the cover hole, the pinhead having a larger diameter than the pin shaft; wherein
    the insulator outer surface is brazed to the hole surface; and
    the insulator is brazed to a portion of the pin shaft.

16. The feedthrough assembly of claim 15, wherein the top surface of the insulator is brazed to an underside of the pinhead.

17. The feedthrough assembly of claim 15, wherein the pinhead and the pin shaft are formed of one piece of metal.

18. The feedthrough assembly of claim 15, wherein the pinhead and the pin shaft are formed of more than one piece of metal.

19. The feedthrough assembly of claim 15, wherein the pin shaft has a diameter of about 0.1 mm to about 3 mm.

20. The feedthrough assembly of claim 15, wherein the insulator includes a nonglass ceramic.

21. A sealed battery comprising:
    a battery case;
    a positive electrode within the case;
    a negative electrode within the case;
    an electrolyte within the case; and
    a feedthrough of claim 15 sealing the case, wherein the pin is electrically coupled to one of the electrodes.

22. The battery of claim 21, wherein the positive and negative electrodes are wound around the pin.

* * * * *